United States Patent [19]
Shaltis

[11] 3,726,403
[45] Apr. 10, 1973

[54] DUAL FLOW, SPIN-ON FILTER

[75] Inventor: Robert J. Shaltis, Hastings, Mich.

[73] Assignee: Hastings Manufacturing Company, Hastings, Mich.

[22] Filed: Feb. 8, 1971

[21] Appl. No.: 113,283

Related U.S. Application Data

[63] Continuation-in-part of Ser. Nos. 36,971, May 13, 1970, and Ser. No. 39,741, May 22, 1970, abandoned, and Ser. No. 105,426, Jan. 11, 1971.

[52] U.S. Cl. ................... 210/132, 210/440, 210/443
[51] Int. Cl. ....................... B01d 35/14, B01d 27/10
[58] Field of Search ..................... 210/132, 315, 130, 210/136, 440, 443, 457, 131

[56] References Cited

UNITED STATES PATENTS

| | | | |
|---|---|---|---|
| 3,297,162 | 1/1967 | Mouwen | 210/440 X |
| 3,283,904 | 11/1966 | Buckman et al. | 210/132 |
| 3,374,892 | 3/1968 | Samalon | 210/443 X |
| 2,617,535 | 11/1952 | Hamilton | 210/315 X |
| 3,021,955 | 2/1962 | Joyce | 210/315 X |
| 3,268,077 | 8/1966 | Ball | 210/132 X |
| 3,272,336 | 9/1966 | Humbert, Jr., | 210/132 |
| 3,467,256 | 9/1969 | Humbert, Jr. et al. | 210/457 X |
| 3,567,023 | 3/1971 | Buckman et al. | 210/443 X |

Primary Examiner—Frank A. Spear, Jr.
Attorney—Munson H. Lane and Munson H. Lane, Jr.

[57] ABSTRACT

A dual flow, spin-on filter for an engine lubricating system and for other fluids requiring filtration comprising a filter housing enclosing a fine filter cartridge centrally positioned within the housing, a perforated central tube within the cartridge defining an outlet chamber and surrounded by a fine filter media, the central tube having an outlet end adapted to communicate with an outlet fitting, a restrictor having a metering orifice closing the other end of the central tube providing a by-pass of the fine filter cartridge for a portion of the engine lubricating oil in excess of the amount of oil which the fine filter is normally capable of handling and a coarse filter normally in closed communication with the metering orifice for filtering the portion of the lubricating oil passing through the metering orifice. The coarse filter may be located on either the upstream side or the downstream side of the metering orifice and in one embodiment of the invention the coarse filter is adapted to move away from the metering orifice under predetermined pressure so that fluid flowing through the metering orifice will by-pass the coarse filter.

35 Claims, 13 Drawing Figures

PATENTED APR 10 1973 3,726,403

INVENTOR
ROBERT J. SHALTIS

BY Munson H. Lane
ATTORNEY

INVENTOR
ROBERT J. SHALTIS

BY Munson H. Lane
ATTORNEY

INVENTOR
ROBERT J. SHALTIS

BY Munson H. Lane
ATTORNEY

INVENTOR
ROBERT J. SHALTIS
BY Munson H. Lane
ATTORNEY

DUAL FLOW, SPIN-ON FILTER

The present application is a continuation-in-part of my applications Ser. No. 36,971, filed May 13, 1970; Ser. No. 39,741, filed May 22, 1970 now abandoned; and application Ser. No. 105,426 filed Jan. 11, 1971 entitled "Oil Filter with Improved Anti-Drainback Valve."

This invention relates to an improved dual flow, spin-on filter for an engine lubricating system and more particularly to a dual flow, spin-on filter having a filter housing, a primary filter cartridge positioned within the housing for filtering fine particles from the engine lubricating oil, a secondary coarse filter, and a metering orifice means for proportioning the flow of fluid between the primary and secondary filters.

It is a particular object of this invention to provide a dual flow filter wherein the full capacity of a primary filter may be utilized to filter fine particles from engine lubricating oil, while a secondary coarse filter and metering means is provided to accommodate the quantity of lubricating oil being pumped through the lubricating system which is in excess of the amount of oil the fine filter is capable of handling.

It is a further object of the invention to provide a number of different embodiments of a fluid metering means and secondary coarse filtering means in combination with a primary fine filter which are capable of performing the function stated in the object above.

It is a further object of this invention to provide a dual flow, spin-on filter which comprises a spin-on shell or housing which is sealed or lock-seamed to its base plate, the housing containing a supported filter cartridge in spaced relation from the base plate, the filter cartridge being annular in shape and provided with a perforated outer tube which is radially spaced outwardly from a perforated central tube, and fine filter media filling the space between the outer tube and the central tube, one end of the central tube being open to a fluid outlet passage, and the other end of the central tube being provided with a metering disc having a metering orifice therein, and a coarse filter means provided within the central tube in closed fluid communication with the metering orifice.

With the foregoing objects and features in view and such other objects and features as may become apparent as this specification proceeds, the invention will be understood from the following description taken in conjunction with the accompanying drawings, wherein like characters of reference are used to designate like parts and wherein:

Figure 1:
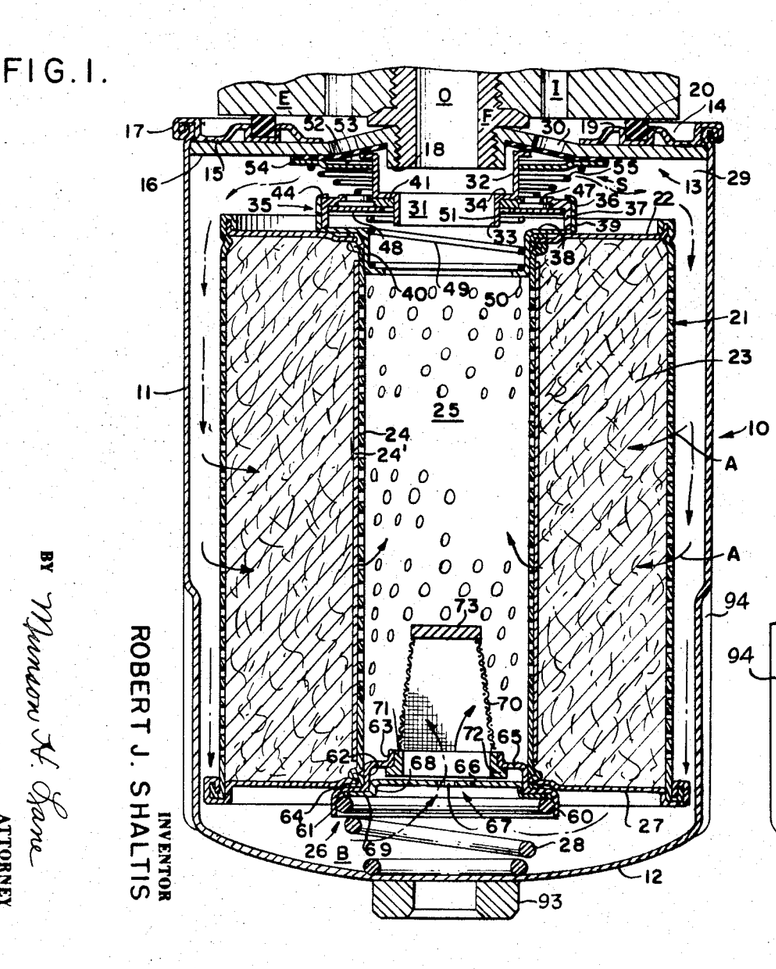
FIG. 1 is a vertical sectional view showing one embodiment of the filter of the invention.
Figure 3:
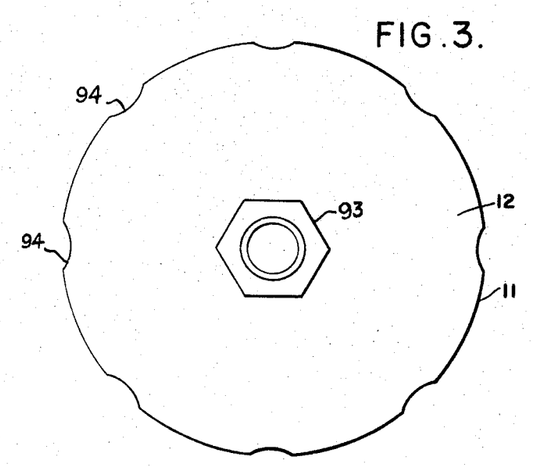
FIG. 3 is an end view on a reduced scale of the domed end of the filter casing common to all embodiments of the invention.

Referring now to the accompanying drawings in detail and more particularly to FIGS. 1 and 3 the dual flow filter of the invention is designated generally by the reference numeral 10. The same is of cylindrical form and its construction is symmetrical with respect to its longitudinal axis.

The filter 10 comprises a spin-on shell or housing 11 formed integrally with a closed dome-shaped end 12, while the opposite end of the housing is closed by a base plate assembly 13 which includes an annular base plate member 14 of relatively thin material secured, as by spot welding 15, or the like to the outer side of a relatively thick base plate member 16. The end of the housing 11 is lock-seamed and sealed as at 17 to the base plate member 14 and hence to the base plate 13 itself, as will be clearly apparent.

The base plate member 16 is provided with an inwardly projecting, internally screw threaded, centrally disposed outlet neck 18 by which, the entire filter is connected to a pipe fitting F of the engine lubricating system. The base plate 14 is shaped to provide an exteriorly opening annular groove 19 having an annular gasket 20 seated therein, this gasket being adapted to sealingly engage the engine E when the neck 18 of the filter is screwed onto the pipe fitting F in the well known manner.

A filter cartridge 21 of suitable construction is positioned in the housing 11 with one end wall 22 of the cartridge being spaced inwardly from the base plate 13. The cartridge 21 includes a filtering medium 23 surrounding a perforated central tube 24 which defines a central outlet chamber 25 within the cartridge. This invention is not limited to the use of one specific type of filtering medium 23 and various filtering media surrounding the perforated central tube 24 can be used. The filter embodiment shown in FIG. 1 includes a depth pack media comprising cotton linters mixed with a slight amount of wood wool to open the pack up for greater flow. A pleated paper media or other filter media could be substituted for the depth pack composed of cotton linters and wood wool within the scope of this invention in its broadest aspects. The other end wall 27 of the filter cartridge is spaced from the domed end 12 of the housing 11 by means of a relatively strong compression spring 28 which bears against the interior surface of the end wall 12 of the housing 11 and is seated against a shoulder of a tubular insert assembly 26 press fitted within the inner end of the central tube 24.

The housing 11 defines around the outside of the cartridge and in the space between the end wall 22 and the base plate 13 an inlet chamber 29 communicated by a plurality of inlet passages 30 is formed in the base plate member 16 in radially spaced relation from the outlet neck 18. Thus, oil flowing through the passages 30 into the inlet chamber 29 enters the filtering medium of the cartridge 21 from the outside and then passes through the perforated tube 24 into the outlet chamber 25 at the inside of the cartridge as indicated by the arrows A in FIG. 1.

Various means can be used to space the end wall 22 of the cartridge 21 from the base plate assembly 13. The filter embodiment shown in FIG. 1 includes substantially the same spacing assembly S disclosed and claimed in U.S. Pat. No. 3,426,900 issued Feb. 11, 1969 to James W. Wilkinson and Robert J. Shaltis. The spacing assembly S includes an antidrainback valve means for preventing drainage of oil from the inlet chamber 29 to the engine when the engine is stopped, and a pressure relief valve means for permitting bypassing of the filter cartridge 21 when the cartridge is dirty or when the oil is excessively viscous under cold conditions.

Since the anti-drain back valve means and the relief valve means incorporated in the spacing assembly S are fully described in the aforementioned patent it will not be necessary to describe the assembly in detail except to enumerate the parts including reference numerals corresponding to reference numerals for like parts in the aforesaid patent. The spacing assembly S includes a tubular adapter 31 having a base portion 32, a reduced inner portion 33, an intermediate shoulder portion 34 and an out-turned flange 53. The out-turned flange 53 seats against the inner circumferential margin of an annular anti-drainback valve 52 and holds the valve 52 against the inner surface of the reinforcing base plate member 16 so as to cover the inlet ports 30. An annular casing 35 having an outer casing member 36 and an inner casing member 37 surrounds the inner portion 33 of the adapter 31 and is seated with a top wall portion 38 in sealing contact with the cartridge end wall 22, and with a tubular extension 40 of lesser diameter than the casing side wall 39 closely fitted within the central tube 24. The inner casing member 37 is seated against the in-turned flange 44 of the outer casing member 36 and against the shoulder 34 of the adapter 31 and has valve ports 47 extending through its bottom wall 41. A relief valve member 48 is slidably mounted within the inner casing member 37 to cover and uncover the relief valve ports 47. The relief valve disc 48 has a central aperture of greater diameter than the outside diameter of the adapter inner portion 33 to provide an annular space 51 for fluid flow between the valve disc 48 and the adapter inner portion 33. A compression spring 49 having one end bearing against the in-turned flange 50 of the casing 35, and its other end bearing against the relief valve member 48 normally forces the relief valve member against the inner casing bottom wall 41 to close the ports 47. A compression spring 55 having one end bearing against the inner casing member 41 and its other end bearing against an annular sealing disc 54 normally biases the anti-drain back valve 52 against the reinforcing plate 16 to seal the inlet ports 30. The resiliency of the spring 55 is such as to permit the anti-drainback valve to open under the normal pressure of fluid in the inlet passages 30 when the engine is running.

The present invention is directed primarily to the use of a continuously open metering orifice means and secondary filter means concentric with the metering orifice, both the orifice and secondary filter means being positioned adjacent the end of the central tube 24 which is opposite the outlet end of the central tube. The metering orifice means and the secondary, or coarse filter means are provided to accommodate the flow of oil required by the engine in excess of the flow of oil which the primary, or fine filter is capable of handling. If the primary filter were used alone it would have to be opened up so much that it would not remove the fine particles carried in the lubricating fluid. The purpose of this invention is therefore to provide a filter having a primary filter capable of removing the fine particles carried by the engine lubricating fluid, and to provide a metering orifice means and secondary coarse filter means which will proportion the fluid flow between the primary filter and the secondary filter in order to accommodate all of the oil normally being pumped by the engine without opening the filter relief valve.

As shown in FIG. 1 the fluid restrictor and secondary filter assembly 26 includes a diametrically stepped tubular insert 60 having a relatively large diameter, outer annular wall portion 61, an intermediate annular wall portion 62 and an inner annular wall portion 63 with first shoulder portion 64 connecting the outer end intermediate wall portion and a second shoulder portion 65 connecting the intermediate and inner wall portions. The tubular insert 60 is press fitted in the end of the central tube 24 opposite the outlet end, with the shoulder portion 64 resting against the end wall 27 of the cartridge 21 and with the intermediate wall portion 62 closely fitted against the inner surface of the central tube 24. A fluid restrictor disc 66 having a continuously open metering orifice 67 of predetermined diameter, an annular wall portion 68 of outside diameter equal approximately to the inside diameter of the inner wall portion 62, and an out-turned radial flange 69 is fitted within the tubular insert 60 with the out-turned flange 69 biased against the shoulder portion 64 by compression spring 28. A secondary coarse filter 70 of frusto conical shape concentric with the metering orifice and having a mounting ring 71 with out-turned flange 72 and a closure plug 73 opposite the mounting ring, is held within the central tube 24 by means of the mounting ring 71 fitted within the inner wall portion 63 of the tubular insert 60. The secondary filter 70 is a relatively coarse filter compared to the primary filter media 23 and may be made of various suitable filter materials such as metal screen, molded nylon screen, sintered bronze, paper and the like.

The filter 10 shown in FIG. 1 being pendantly mounted upon the mounting block E receives oil from the inlet passages I of the mounting block, through the filter inlet passages 30 into the inlet chamber 29. The pressure of the oil when the engine is operating is sufficient to open the anti-drainback valve 52 and allow oil to flow from the inlet passages 30 into the inlet chamber 29. The oil then flows downwardly around the cartridge 21 until the oil completely fills the space between the cartridge 21 and the housing 11 whereupon a pressure differential develops between the inlet chamber and the outlet chamber causing oil to flow through the primary filter 21. A portion of the oil as indicated by the arrow B flows up from the bottom of the filter casing 11 through the continuously open metering orifice 67 and out through the secondary filter 70 into the outlet chamber 25, where it is recombined with the oil flowing through the primary filter. The recombined fluid flow passes upwardly through the outlet chamber 25, the adapter 31 and the outlet passage O of the fitting F and is recirculated through the engine in a well known manner.

One of the advantages of this invention over competitive designs is that the full cartridge 21 is used to filter oil whereas in some of the competitive designs a portion of the filter cartridge is not utilized because of a bypass section that allows oil to bypass a portion of the filter media.

The size of the metering orifice 67 is selected so that a proper pressure differential is present between the inlet chamber 29 and the outlet chamber 25 when the inlet chamber is full of oil to cause the primary filter to operate at near its full capacity. If the orifice 67 is too small the primary filter media 23 and the metering orifice 67 will not pass the amount of oil being circulated through the engine whereupon pressure will build up in the inlet chamber 29 sufficient to cause the relief valve 48 to open and bypass the oil from the inlet chamber 29 directly into the outlet chamber 25. If the orifice 67 is too large the pressure differential between the inlet chamber 29 and the outlet chamber 25 will not be sufficient to cause the primary filter to filter at near full capacity and too large a proportion of the oil will bypass the primary filter through the metering orifice 67 and the secondary filter 70 thus not enough of the fine particles (normally separated by the primary filter) will be separated from the oil.

Figure 2:
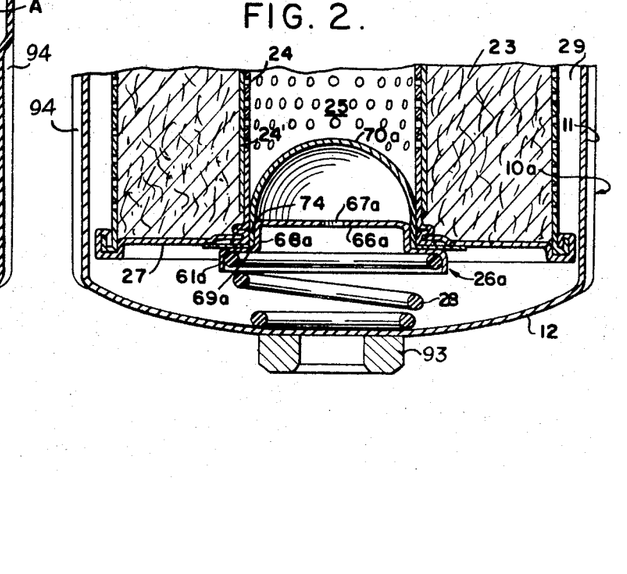
FIG. 2 is a fragmentary vertical sectional view showing a second embodiment of the filter of the invention.

FIG. 2 shows a modified embodiment of the fluid restrictor and secondary filter assembly 26a; otherwise the filter 10a is similar to the filter shown in FIG. 1. The embodiment shown in FIG. 2 includes a restrictor disc 66a with metering orifice 67a similar to the corresponding parts in FIG. 1, but instead of having a separate tubular insert and a separate restrictor disc as in FIG. 1, the two parts are formed as one part in the embodiment of FIG. 2. Peripherially joined to the restrictor disc 66a is an annular wall portion 68a of outside diameter less than the inside diameter of the central tube 24 so as to provide a space 74 for receiving in binding relationship the peripheral margin of a hemispherical secondary filter element 70a. An outturned shoulder portion 69a is joined to the outer edge of the wall portion 68a and an outer annular wall portion 61a is joined to the outer edge of the shoulder portion 69a to provide an outwardly opening cup to receive one end of the compression spring 28. The compression spring 28 forces the shoulder portion 69a against the end wall 27 in sealing relationship thereto. The coarse secondary filter means 70a may be made of various materials but is preferably a formed paper filter. The operation of the filter 10a shown in FIG. 2 is similar to the operation of the filter shown in FIG. 1 and need not be further described.

Figure 4:
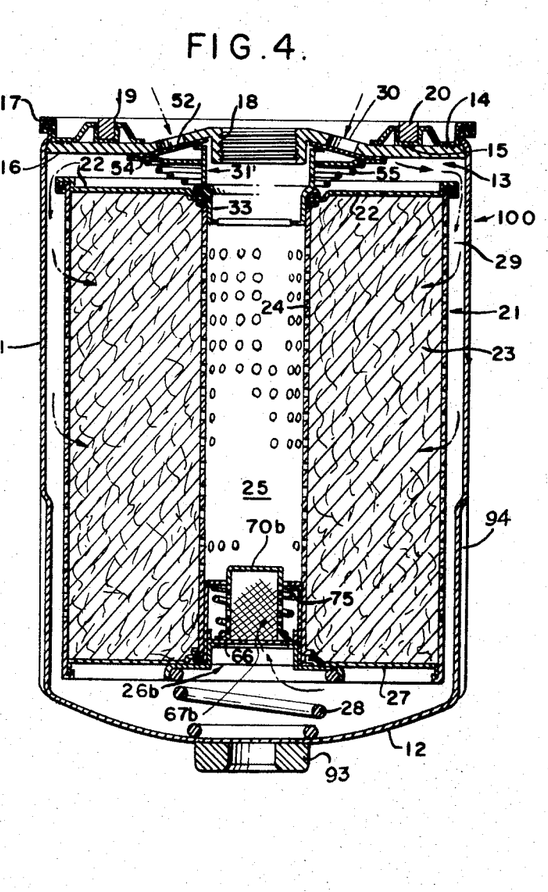
FIG. 4 is a vertical sectional view showing a third embodiment of the invention.
Figure 5:
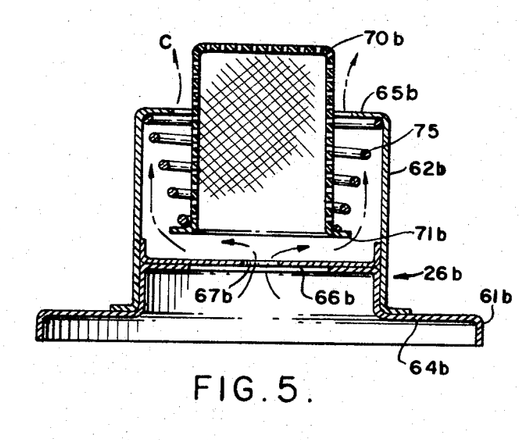
FIG. 5 is an enlarged vertical sectional view of metering orifice, secondary filter and adapter shown in FIG. 4 showing the secondary filter lifted to by-pass position.

In FIGS. 4 and 5 a third embodiment of the invention is shown. This embodiment differs from the embodiments previously discussed in that the filter 100 omits the bypass valve at the entrance end of the filter, but instead yieldably mounts a secondary filter 70b in normally sealed relationship to a restrictor disc 66b within the central tube 24 to provide a bypass of the secondary filter 70b.

The housing 11 and mounting assembly 13 of the filter 100 are similar to the housing and mounting assembly 13 shown in FIG. 1 and need not be further described. The filter cartridge 21 is similar to the filter cartridge 21 as shown in FIG. 1 and it is spaced from the mounting plate assembly 13 by a diametrically stepped tubular insert 31'. An annular anti-drainback valve 52 is disposed against the inside surface of the base plate member 16 covering the inlet passages 30. The inner edge of the valve 52 is held sealed against the base plate 16 by means of the heavy compression spring 28 acting through the filter cartridge 21, and the tubular adapter 31'. The outer margin of the anti-drainback valve 52 is normally held against the base plate 16 by means of the compression spring 55 and sealing disc 54 interposed between the cartridge end 22 and the outer margin of the valve 52. The anti-drainback valve 52 functions in a manner previously described.

The fluid restrictor and secondary filter assembly 26b of the filter 100 is fitted in the end of the perforated central tube of the cartridge 21 opposite the inlet-outlet end of the filter and is better seen by referring to FIG. 4 where the assembly 26b is shown in an enlarged view with the secondary filter lifted to bypass position. The assembly 26b includes a diametrically stepped tubular insert having a relatively large base portion 61b, a reduced inner portion 62b, a radially extending annular shoulder portion 64b, connecting the base portion 61b and the reduced inner portion 62b. The reduced inner portion of the tubular insert has an outside diameter which is equal approximately to or slightly larger than the inside diameter of the central tube 24 so as to be frictionally held within the central tube. The base portion 61b of the tubular insert is adapted to receive one end of the heavy compression spring 28 which presses the insert in sealing relationship against the end wall 27 of the filter cartridge 21. A fluid restrictor disc 66b having a metering orifice 67b is secured intermediately within the reduced portion 62b of the tubular insert. A cup-shaped secondary filter element 70b having an out-turned flange 71b is yieldably mounted in inverted position over the inner side of restrictor disc 66b in surrounding relationship to the metering orifice 67b. The reduced inner portion 62b has an inturned flange 65b at its inner end against which is seated one end of a compression spring 75 which surrounds the secondary filter member 70b. The other end of the compression spring bears against the out-turned flange 71b of the filter member 70b and normally presses the filter member against the restrictor disc 66b and in sealing relationship thereto.

The filter 100 is adapted to be mounted by means of the threaded outlet neck 18 onto an outlet fitting F of an engine mounting block E in the same manner as the filter shown in FIG. 1. Fluid under pressure enters the filter 100 through the inlet passages 30 by forcing the anti-drainback valve 52 open. The fluid fills the inlet chamber 29 and a portion of the fluid flows through the fine filter media 23. A second portion of the fluid flows through the metering orifice 67b and normally through the secondary filter 70b into the outlet chamber 25 when it is seated against the restrictor disc 66b as shown in FIG. 4. However, if the pressure differential between the inlet chamber 29 and the outlet chamber 25 exceeds a predetermined value the compression spring 75 yields to permit the filter 70b to become unseated from the restrictor disc 66b and allow fluid to pass around the outside of the filter 70b as shown by the arrows C in FIG. 5.

Figure 6:
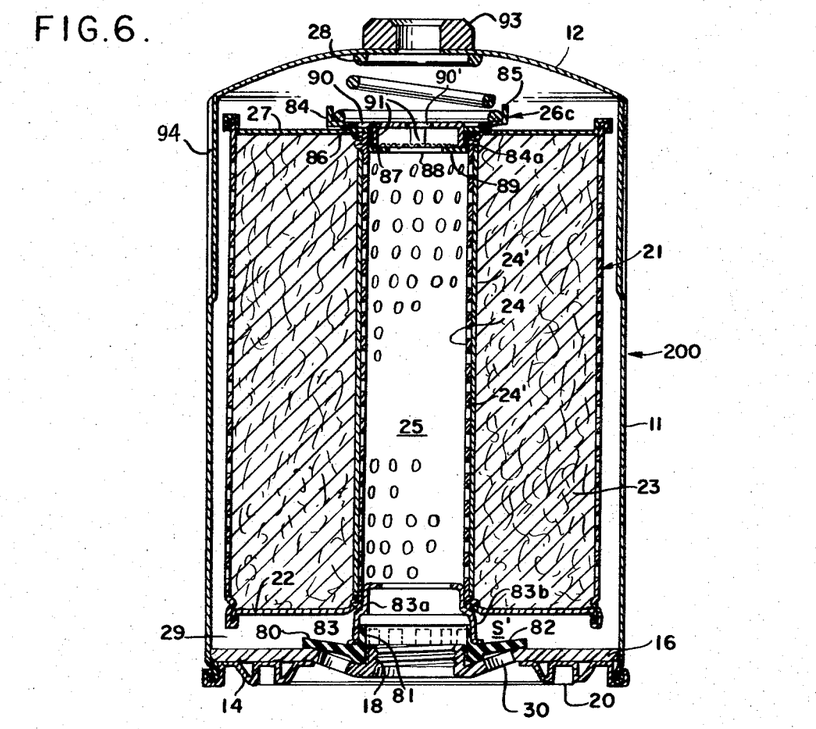
FIG. 6 is a vertical sectional view of a fourth embodiment of the invention.

FIG. 6 shows another embodiment of the invention. The filter 200 includes the same housing 11 and filter cartridge 21 as does the filter 10 shown in FIG. 1, but includes a modified restrictor and secondary filter assembly 26c and a combination anti-drainback and relief valve assembly S'. The combination anti-drainback and relief valve assembly S' is the subject of my U.S. Pat. application Ser. No. 39,741, filed May 22, 1970, now abandoned and need not be described in detail. It includes a one piece resilient valve member 80 having a tubular relief valve portion 81 and a radially extending flange portion 82 which covers the inlet passages 30 and serves as an anti-drainback valve member. A stepped tubular adapter 83 has a reduced end 83seated in the central tube 24 and a relatively large base end 83B which surrounds the tubular relief valve portion 81 and is seated over the inner margin of the flange portion 82. The base end 83b has equally spaced apertures therein which are normally covered by the tubular relief valve portion 81, but which are uncovered by excessive fluid pressure within the inlet chamber 29, acting on the tubular relief valve portion to force it inwardly. The radial outer margin of the flange portion 82 is adapted to yield inwardly under the normal pressure of fluid in the inlet passages 30 and uncover the inlet passages 30 allowing oil to enter the inlet chamber 29.

The heavy compression spring 28 bearing against the domed end 12 of the filter housing forces the cartridge 21, the adapter 83 and the valve member 80 downwardly causing the inner margin of the valve member 80 to seat against the end plate 16 adjacent the outlet neck 18.

Figure 7:
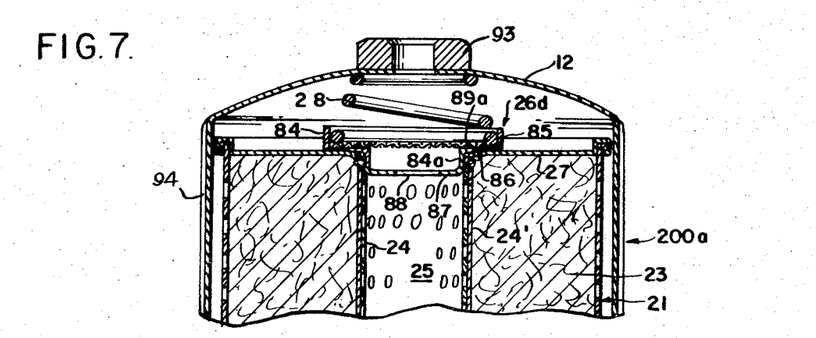
FIG. 7 is a fragmentary vertical sectional view of a fifth embodiment of the invention.
Figure 8:
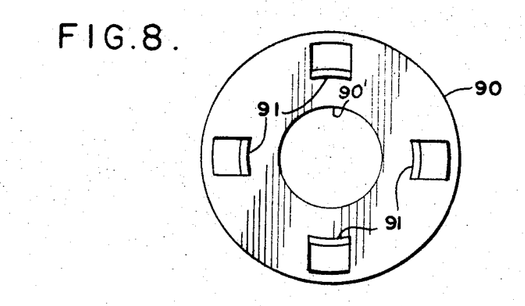
FIG. 8 is a bottom plan view of the adapter disc shown in FIG. 6.

The fluid restrictor and secondary filter assemblies 26c and 26d shown in FIGS. 6 and 7 include similar tubular inserts 84 having a reduced inner tubular end portion 84a frictionally fitted within the inner end of the central tubes 24 of the respective filters 200 and 200a and a relatively large tubular base portion 85 extending outwardly from the cartridge end 27, the base portion 85 and the reduced end portion 84a being connected by a shoulder portion 86 which is seated against the cartridge end 27. A restrictor disc portion 87 closes the inner end of the reduced portion 84a of the tubular insert except for the metering orifice 88 extending through the center of the disc portion 87.

The filter assembly 26c shown in FIG. 6 includes a secondary filter disc screen 89 which is inserted in the reduced tubular portion 84a and is seated against the restrictor disc 87. An adapter disc 90 having bent down legs 91 is seated within the base portion 85 of the tubular insert against the shoulder portion 86 with the legs 91 extending within the inner portion 84a and of such length as to bear against the filter screen 89 and hold it in place against the restrictor disc portion 87. The compression spring 28 which has one end bearing against the inner surface of the domed end 12 and its other end bearing against the adapter 90 within the tubular insert 84 holds the adapter 90 and secondary filter disc 89 in place. A central aperture 90' extends through the adapter 90.

The embodiment 26d of the restrictor secondary filter assembly shown in FIG. 7 dispenses with the adapter 90 shown in FIG. 6 but instead places a secondary filter disc 89a of diameter equal to the inside diameter of the base portion 85 within the base portion 85 against the shoulder portion 86. The compression spring 28 bears against the filter screen 89a and holds it seated within the tubular base end 85 of the tubular insert 84.

In both of the embodiments 26c and 26d the secondary filter screens 89 and 89a respectively filter the coarse particles from the portion of the fluid passing through the restrictor metering orifice 88 prior to the fluid passing through the metering orifice 88 whereas in the embodiments shown in FIGS. 1, 2 and 4 the fluid going through the metering orifice is filtered on the downstream side of the orifice.

Within the specification the terms "fine" and "coarse" as applied to describe the primary and secondary filters respectively are relative terms used for comparing the two filters and for describing their functions. By way of example but not by way of limitation, the fine filter may be selected to remove particles whose minimum diameters are within the range of 3 to 4 microns while, the coarse filter may be selected to remove particles whose minimum diameters are within the range of 80 to 100 microns.

The nut 93 affixed to the domed end 12 of the filter housing 11 and the longitudinal grooves 94 in the housing 11 are provided to facilitate grasping the filter housing with the hands and/or a suitable wrench to assemble or disassemble the filter with respect to the engine block E and outlet fitting F (FIG. 1) in a well known manner.

While the filter 10 shown in FIG. 1 is shown mounted with its domed end down, the filters of this invention are not limited to any one mounting position and can be mounted in any position according to the mounting arrangements provided on different makes of vehicles.

Figures 9, 10, 11, 12:
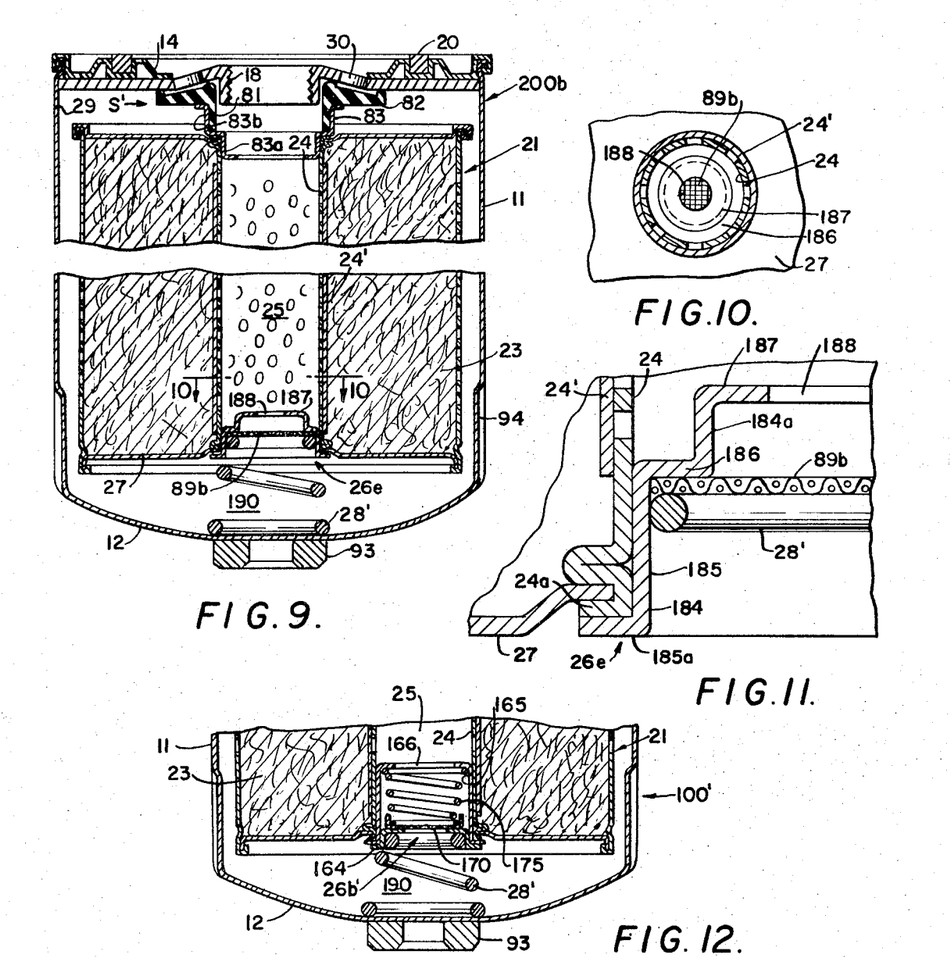
FIG. 9 is a fragmentary vertical sectional view of another form of the invention, which is a modification of the form shown in FIG. 6.
FIG. 10 is a fragmentary sectional view taken from the plane of the line 10—10 of FIG 9.
FIG. 11 is an enlarged fragmentary detail showing the lower portion of the filter cartridge shown in FIG. 9.
FIG. 12 is a fragmentary vertical sectional view of the lower portion of a filter which is a modification of the filter shown in FIG. 4.

A further modified arrangement of the filter shown in FIG. 6 is shown in FIG. 9.

The filter 200b includes the same housing 11, filter cartridge 21 and combination anti-drainback and relief valve assembly S' as does the filter 200 shown in FIG. 6, but includes a further modified restrictor and secondary filter assembly 26e and a modified spring 28'. The filter form shown in FIG. 9 eliminates the adapter disc 90 which is provided in the form shown in FIG. 6 and provides a modified tubular insert 184. Referring to FIG. 11, the modified tubular insert 184 includes a tubular base portion 185 which is frictionally fitted inside one end of the central tube 24, a reduced end portion 184a connected to the base portion by an intermediate shoulder portion 186, an out-turned base flange 185a seated against the out-turned flanged end 24a of the central tube 24 and a restrictor disc portion 187 which extends across the inner end of the reduced portion 184a. A secondary filter disc 89b is pressed against the shoulder portion 186 by the frustoconical shaped, coiled compression spring 28' which is interposed under compression between the domed end 12' of the filter housing 11 and the secondary filter 89b. The spring 28' has an enlarged base end which rests against the center portion of the inside surface of the domed end 12' and a reduced diameter inner end which fits snugly inside the tubular base portion 185 of the tubular insert 184. The restrictor disc portion 187 has a metering orifice 188 extending through the center of the restrictor disc.

The function of the filter 200b is very similar to the function of the filter 200 shown in FIG. 6 except that fluid which bypasses the primary filter 23 must flow first through the coarse secondary filter 89b and then through the metering orifice 188, whereas in FIG. 6 the bypass fluid flows first through the metering orifice 90' and then through the secondary filter disc 89. An advantage in the modified form shown in FIG. 9 over the form shown in FIG. 6 is that the modified form is cheaper to manufacture since one of the parts required in the form shown in FIG. 6 is eliminated. The form shown in FIG. 9 has the advantage over the form shown in FIG. 7 in that the filter disc 89b is mounted inside the center tube 24 in a plane further removed from the end of the central tube 24 than is the case with the filter disc 89a shown in FIG. 7. By moving the filter disc 89' inside the central tube 24, the filter disc is moved further away from the sump 190 provided in the domed end of the filter housing where dirt will normally collect.

While FIGS. 6 and 7 show the domed ends of the filters uppermost, in practice the domed end will usually be positioned in a downward position, although the filters are capable of functioning in any orientation.

It is within the scope of this invention that various forms of anti-drainback valve or anti-drainback valves in combination with bypass valves can be used at the inlet end of the filters. By way of example the anti-drainback valve disclosed in my pending application Ser. No. 105,426 entitled "Oil Filter with Improved Anti-Drainback Valve," filed Jan. 11, 1971 may be substituted for the anti-drainback and relief valve assemblies shown in FIGS. 1, 4, 6 and 9.

Figure 13:
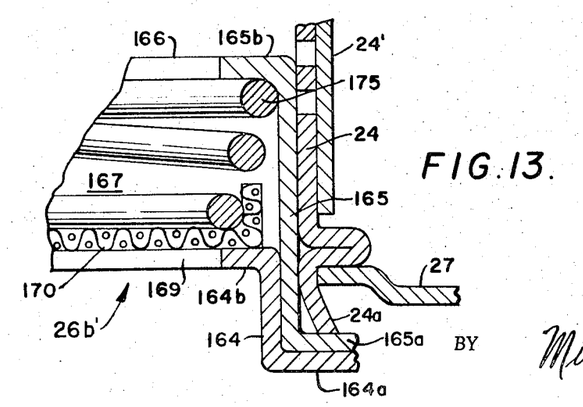
FIG. 13 is an enlarged fragmentary detail showing the lower center portion of the filter cartridge and fluid restrictor and secondary filter assembly shown in FIG. 12.

FIGS. 12 and 13 show a filter 100' having a modified form 26b' of the fluid restrictor and secondary filter assembly 26b illustrated in FIGS. 4 and 5. The modified form 26b' is simpler in construction and requires fewer parts than the form shown in FIGS. 4 and 5.

The filter 100' is essentially similar to the filter 100 illustrated in FIG. 4 with the exception that the modified fluid restrictor and secondary filter assembly 26b' is substituted for the fluid restrictor and secondary filter assembly 26b and a modified coil spring 28' is substituted for the coil spring 28 of the filter 100. Therefore only the lower portion of the filter 100' is shown in FIG. 12 since it will be understood that the upper portion, not shown, is similar to the upper portion of the filter 100 shown in FIG. 4. It will be further understood that the filters 100 and 100' are normally cylindrical in shape.

Referring to FIG. 13 an enlargement of the right hand portion of the fluid restrictor and secondary filter assembly mounted in the lower end of the central tube 24 of the filter cartridge 21 illustrated in FIG. 12 is shown. The assembly 26b' includes a tubular insert 165 fitting snugly within the lower end of the central tube 24 of the filter cartridge 21 and frictionally held therein. An out-turned flange 165a provided on the outer end of the tubular insert 165 rests against the lower circumferential edge 24a of the central tube 24, and an in-turned flange 165b provided on the inner end of the tubular insert 165 forms a seat for the enlarged end of the coil spring 175 subsequently to be described.

A second tubular insert 164 is frictionally held within the outer end of the tubular insert 165 and is provided with an out-turned annular flange 164a at its outer end which seats against the out-turned flange 165a of the tubular insert 165 and an in-turned annular flange 164b at its inner end which provides a seat for the secondary filter disc 170. The length of the second tubular insert 164 is substantially less than the length of the tubular insert 165 so that the in-turned flanges 164b and 165b are spaced from each other to provide a secondary filter chamber 167. The frusto-conical coiled spring 175 has its enlarged base end seated against the inner face of the in-turned flange 165b within the relief valve chamber 167 and its reduced end seated against the secondary filter disc 170, and being under compression it normally holds the filter disc 170 seated against the in-turned flange 164b. The compression of the spring 175 is selected so that the spring 175 will yield when a predetermined fluid pressure is exerted against the secondary filter 170 to permit the filter to unseat and allow fluid to flow upwardly from the sump 190 through the orifice 169 defined by the annular flange 164b, around the filter disc 170, through the chamber 167 and out through the orifice 166 defined by the in-turned flange 165b into the discharge chamber 25 provided in the central tube 24. In the assembly 26b' the tubular insert 165 with the out-turned flange 165b serves as a fluid restrictor means having a metering orifice 166 which is sized so that at any time the secondary filter 170 and the primary filter 23 may become clogged with dirt the orifice 166 will allow adequate flow of lubricating fluid to the engine. The metering orifice 166 however is small enough so that the fluid restrictor will proportion the flow of fluid between the primary fine filter means 23 and the secondary coarse filter means 170. The desired proportions of the total fluid flow performed by the fluid restrictor is such that the portion of total fluid flow through the filter 100' which the primary filter media is normally capable of passing in an unclogged, or clean condition, will flow through the primary filter means 23 and the remainder of the total fluid flow as required for satisfactory engine lubrication will flow through the secondary or coarse filter means 170. It should here be recognized that in many engine situations the total flow of lubricant required for satisfactory engine lubrication exceeds the rate of flow which a primary fine filter is capable of handling for which reason a coarse or secondary filter is needed to handle the excess flow and screen out relatively large particles from the excess flow which would damage the engine As the fluid continues to circulate through the engine and through the filter in closed circuit a different portion of fluid flows each successive time through the primary filter and thus, with each successive cycle, fine particles are removed from a different portion of the lubricating fluid. Under normal conditions however, the filter disc 170 will remain seated against the annular flange 164b and filter a portion of the fluid flow being treated by the entire filter 100'.

The modified coil spring 28' which is interposed between the domed end 12 of the filter 100' and the cartridge 21, is frusto-conical in shape, having an enlarged end seated against the central portion of the inner face of domed end 12 and a reduced end which seats against the underside, or outer surface, of the inturned flange 164b. The coil spring 28' when seated as shown in FIG. 12 exerts pressure against the cartridge 21 to force it in a direction opposite from the domed end in the same manner as does the spring 28 described in connection with the filter 100 shown in FIG. 4.

While the filter disc 170 is shown in FIGS. 12 and 13 as having an annular cylindrical flange, it may be flat similar to the filter disc 89b shown in FIGS. 9 and 10.

While in the foregoing there have been described and shown various embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed is:

1. A filter element for filtering a flow of fluid with respect thereto comprising a perforated central tubular member defining a central discharge chamber having inlet and outlet end portions and having a plurality of apertures extending laterally therethrough in communication with said discharge chamber, primary filter means disposed about said perforated tubular member for filtering a portion of said flow of fluid, the outlet end portion of said perforated tubular member being open and adapted for connection to a discharge passage, fluid restrictor means disposed within the inlet end of the perforated tubular member and having a continuously open fluid metering orifice therein concentric with said tubular member for passing a metered portion of said fluid flow into said discharge chamber and secondary filter means disposed at the inlet end portion of the perforated tubular member adjacent to said fluid restrictor means and comprising a filter disc located upstream from the fluid metering orifice.

2. The filter element set forth in claim 1 wherein there is a tubular insert mounted in said inlet end portion of said central tubular member, and said fluid restrictor means is mounted within said tubular insert.

3. The filter element set forth in claim 1 wherein said tubular insert is diametrically stepped intermediate the ends thereof to provide a relatively large base portion and a first reduced inner portion with a radially extending annular shoulder portion therebetween, said first reduced inner portion being seated within said central tubular member, said base portion of said insert being of greater diameter than said tubular member and extending outwardly from said inlet end of said tubular member.

4. The filter element set forth in claim 3 wherein said fluid restrictor means is a stepped disc having a radially outwardly extending flange, a central disc portion and an intermediate tubular connecting portion, said intermediate tubular connecting portion being closely fitted in said first reduced inner portion of said tubular insert with the radially outwardly extending flange seated on said annular shoulder portion of said tubular insert.

5. The filter element set forth in claim 4 wherein said metering orifice is located in the center of said central disc portion.

6. The filter element set forth in claim 3 wherein said first reduced inner portion of said tubular insert has an outside diameter less than the inside diameter of said central tubular member to provide an annular space between said central tubular member and said first reduced inner portion, said second filter means having an annular mounting portion fitted in the space between said tubular member and said first reduced upper portion in sealed relationship to said first reduced upper portion.

7. The filter element set forth in claim 6 wherein said fluid restrictor means is a central disc portion integrally attached to said first reduced inner portion, and said metering orifice means extends through said central disc portion.

8. The filter element set forth in claim 3 wherein said fluid restrictor means is an integral transverse wall closing the inner end of said first reduced inner portion.

9. The filter element set forth in claim 8 wherein said secondary filter means is a screen disc seated within said first reduced inner portion against said transverse wall.

10. The filter element set forth in claim 9 together with an adapter disc seated within said base portion, and having legs extending into said first reduced inner portion bearing against said screen disc for holding said screen disc in position against said transverse wall.

11. The filter element set forth in claim 8 wherein said secondary filter means is a screen disc seated within said relatively large base portion.

12. The filter element set forth in claim 1 together with means within said tubular member for by-passing fluid passing through said metering orifice means around said secondary filter means when the fluid pressure differential across said secondary filter means in the normal direction of fluid flow exceeds a predetermined pressure differential.

13. The filter element set forth in claim 1 wherein said primary filter means is a fine filter and said secondary filter means is coarse in comparison to said first filter means.

14. The filter element set forth in claim 1 in combination with a casing therefor.

15. The filter element set forth in claim 14 wherein said casing comprises a tubular casing portion surrounding said filter element and radially spaced outwardly thereof to provide an annular fluid passage, a mounting plate secured to one end of said tubular casing portion and overlying said one end of said central tubular member in axially spaced relationship thereto, and a closed end portion secured to the opposite end of said tubular casing portion in axially spaced relationship to said other end of said central tubular member, said mounting plate having a centrally disposed outlet neck in axial alignment with said tubular member and inlet passage means spaced radially outwardly from said neck.

16. The filter element set forth in claim 15 together with non-return valve means for preventing fluid flow outwardly from said casing through said inlet passage means.

17. The filter element set forth in claim 16 together with by-pass means for by-passing said filter element within said casing directly from said inlet passages to said outlet chamber upon the pressure differential between the inlet passages and said outlet chamber exceeding a predetermined value.

18. The combination defined in claim 14 wherein resilient compression means are provided between one end of the casing and the filter element, said compression means engaging said filter element at the inlet end of the central perforated tubular member.

19. The combination as defined in claim 18 wherein the compression means engages said secondary filter means.

20. The filter element set forth in claim 1 wherein said fluid restrictor means comprises a diametrically stepped tubular insert mounted in said inlet end portion of said central tubular member, said stepped tubular insert having an enlarged outer end portion snugly fitted within said central tubular member, a reduced inner end portion and an intermediate shoulder portion connecting said enlarged and reduced end portions, said reduced end portion having an integral in-turned annular flange which defines said metering orifice, said secondary filter means being seated against said intermediate shoulder within said enlarged outer end portion.

21. The filter element set forth in claim 20 wherein the enlarged outer end of said tubular insert is provided with an out-turned annular flange which is seated against the end of said inlet end portion of the perforated tubular member.

22. The filter element set forth in claim 1 wherein said fluid restrictor means comprises a first tubular insert mounted in said inlet end portion of said central tubular member, said tubular insert having an outer end with an out-turned annular flange which is seated against the outer end of said inlet end portion and an inner end with an in-turned annular flange which defines said metering orifice, a second tubular insert snugly fitted within the end of said tubular insert, said second tubular insert having an outer end with an out-turned annular flange seated against the out-turned annular flange of said first tubular insert and an inner end provided with an in-turned annular flange, said second tubular insert being of substantially less length than said first tubular insert so that the in-turned annular flanges of said first and second inserts are spaced apart to provide a secondary filter chamber therebetween, said secondary filter means being a filter disc of less diameter than the inside diameter of said first tubular insert provided within said secondary filter chamber, and resilient means for normally biasing said filter disc against the in-turned annular flange of said second tubular insert, said resilient means yielding upon the occurrence of a predetermined pressure differential across said filter disc to allow said filter disc to move away from said in-turned annular flange to provide a fluid passage through said secondary filter chamber around said filter disc and out through said metering orifice into said discharge passage.

23. The filter element set forth in claim 22 wherein said resilient means is a coil compression spring having one end seated inside said secondary filter chamber against the in-turned flange of said first tubular insert, and its other end seated against said filter disc.

24. The filter element set forth in claim 1 wherein said fluid restrictor means comprises a tubular insert mounted in said inlet end portion of said central tubular member in sealing engagement therewith, barrier means provided across one end of said tubular insert, said barrier means having said metering orifice therein, said secondary filter means comprising a filter disc disposed within said tubular insert, said filter disc having a smaller diameter than the inside diameter of said tubular insert to provide a fluid passage between said filter disc and said tubular insert, annular seating means within said tubular insert and spaced from said barrier means for seating said filter disc, resilient means normally biasing said filter disc toward said seating means against the normal direction of fluid flow through said filter disc, said resilient means yielding upon the occurrence of a predetermined pressure differential across said filter disc to allow said filter disc to move away from said annular seating means.

25. A filter element as set forth in claim 1 wherein the primary filter means is of the depth type.

26. In a filter device for filtering a flow of fluid with respect thereto a housing having a base plate closing one end of the housing and having an inlet formed therein for the flow of fluid to the device and an outlet formed therein for the flow of fluid from the device, a filter element mounted within the housing, said filter element comprising a central tubular member defining a central discharge chamber and having inlet and outlet end portions and having a plurality of apertures extending through said tubular member in communication with said discharge chamber, primary filter means disposed about said tubular member for filtering a portion of said flow of fluid, the outlet end portion of said tubular member being open and adapted for connection to a discharge passage, fluid restrictor means having a continuously open fluid metering orifice therein disposed within the inlet end portion of said tubular member for passing a metered portion of said fluid flow into said discharge chamber, and secondary filter means disposed within the inlet end of the tubular member, adjacent said fluid restrictor means, said filter device including spacing means engaging said outlet end portion of said tubular member for spacing said filter element from said base plate and for providing a discharge passage from said discharge chamber to said outlet opening, said secondary filter means comprising a filter disc located upstream from the fluid metering orifice.

27. The filter element set forth in claim 26 wherein said spacing means includes a relief valve means which is normally closed, and which opens upon the occurrence of an abnormal pressure differential between the inlets and outlets of said filter device to bypass said filter elements.

28. The filter device set forth in claim 27 together with anti-drainback valve means covering said inlet in said base plate.

29. The filter device set forth in claim 26 wherein said spacing means includes a unitary relief valve and anti-drainback valve means.

30. A filter element for filtering a flow of fluid with respect thereto comprising a central tubular member defining a central discharge chamber and having a plurality of apertures extending therethrough in communication with said discharge chamber, a primary filter means disposed about said tubular member for filtering a portion of said flow of fluid, one end portion of said tubular member being open and adapted for connection to a discharge passage, a fluid restrictor means having a fluid metering orifice therein disposed adjacent the other end portion of said tubular member for passing a metered portion of said fluid flow into said discharge chamber, a secondary filter means disposed adjacent said fluid restrictor means for filtering the fluid passing through said metering orifice means, and a tubular insert mounted in said other end portion of said central tubular member and said fluid restrictor means being within said tubular insert, said tubular insert being diametrically stepped intermediate the ends thereof to provide a relatively large base portion and a first reduced inner portion with a radially extending annular shoulder portion therebetween, said first reduced inner portion being seated within said central tubular member, said base portion of said insert being of greater diameter than said tubular member and extending outwardly from said other end of said tubular member, said fluid restrictor means being a stepped disc having a radially outwardly extending flange, a central disc portion and an intermediate tubular connecting portion, said intermediate tubular connecting portion being closely fitted in said first reduced inner portion of said tubular insert with the radially outwardly extending flange seated on said annular shoulder portion of said tubular insert, said tubular insert having a second reduced inner portion connected to the inner end of said first reduced inner portion by a second annular shoulder portion, and said secondary filter means having a mounting ring fitted closely within said second reduced inner portion in sealed relationship thereto.

31. The filter element set forth in claim 30 wherein said secondary filter means further includes a filter screen secured to said mounting ring.

32. The filter element set forth in claim 31 wherein said filter screen is frusto conical in shape having an open base end secured to said mounting ring and a reduced diameter opposite end extending further within said tubular member from said mounting ring, and a closure plug secured to said reduced diameter opposite end.

33. A filter element for filtering a flow of fluid with respect thereto comprising a central tubular member defining a central discharge chamber and having a plurality of apertures extending therethrough in communication with said discharge chamber, a primary filter means disposed about said tubular member for filtering a portion of said flow of fluid, one end portion of said tubular member being open and adapted for connection to a discharge passage, a fluid restrictor means having a fluid metering orifice therein disposed adjacent the other end portion of said tubular member for passing a metered portion of said fluid flow into said discharge chamber, a secondary filter means disposed adjacent said fluid restrictor means for filtering the fluid passing through said metering orifice means, and a tubular insert mounted in said other end portion of said central tubular member, and said fluid restrictor means being mounted within said tubular insert, said secondary filter means including a filter member disposed within said tubular insert surrounding said metering orifice on the side of said metering orifice toward said one end portion of said tubular member, resilient biasing means normally biasing said filter member into sealing engagement with said fluid restrictor means, said resilient biasing means being adapted to yield under a predetermined fluid pressure to allow the fluid flowing through said metering orifice to bypass said filter member.

34. A filter element for filtering a flow of fluid with respect thereto comprising a central tubular member defining a central discharge chamber and having a plurality of apertures extending therethrough in communication with said discharge chamber, a primary filter means disposed about said tubular member for filtering a portion of said flow of fluid, one end portion of said tubular member being open and adapted for connection to a discharge passage, a fluid restrictor means having a fluid metering orifice therein disposed adjacent the other end portion of said tubular member for passing a metered portion of said fluid flow into said discharge chamber, a secondary filter means disposed adjacent said fluid restrictor means for filtering the fluid passing through said metering orifice means, and a tubular insert mounted in said other end portion of said central tubular member, said fluid restrictor means being a transverse wall member mounted intermediate the ends of said tubular insert and dividing said tubular insert into a fluid entrance portion and a fluid exit portion, the fluid entrance portion facing outwardly from said other end of said tubular member, and said fluid exit portion facing into the interior of said central tubular member, said secondary filter means including a cup shaped filter member disposed within said fluid exit portion and having an out-turned lip portion adjacent the open end of said cup shaped filter member disposed in surrounding relationship to said metering orifice, resilient biasing means normally biasing said cup shaped filter member axially toward said transverse wall, said biasing means being adapted to yield in response to a predetermined fluid pressure differential across said cup shaped filter member to permit fluid flowing through said metering orifice means to by-pass said cup shaped filter means when the pressure differential across said filter means in the direction of the other end of said tubular member exceeds a predetermined pressure.

35. The filter element set forth in claim 34 wherein the fluid exit portion of said tubular insert has a radially inwardly extending annular flange at the fluid exit end thereof defining an exit aperture of diameter greater than the outside diameter of said cup shaped filter member to permit the cup shaped filter member to reciprocate axially through said exit aperture with a fluid passage between the edge of said inwardly extending flange and said cup shaped filter member, said resilient biasing means being a coiled spring having one end seated against said inwardly extending annular flange and the other end seated against the out-turned lip portion of said cup shaped filter member.

* * * * *